United States Patent
Noguchi

(10) Patent No.: US 11,171,513 B2
(45) Date of Patent: Nov. 9, 2021

(54) WIRELESS POWER TRANSMITTING DEVICE, CONTROL CIRCUIT THEREOF, AND WIRELESS CHARGER

(71) Applicant: ROHM CO., LTD., Kyoto (JP)

(72) Inventor: Takashi Noguchi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 254 days.

(21) Appl. No.: 16/423,778

(22) Filed: May 28, 2019

(65) Prior Publication Data
US 2019/0372396 A1  Dec. 5, 2019

(30) Foreign Application Priority Data

May 29, 2018  (JP) .............................. JP2018-102531

(51) Int. Cl.
| | | |
|---|---|---|
| *H01M 10/46* | (2006.01) | |
| *H02J 50/12* | (2016.01) | |
| *H02J 7/02* | (2016.01) | |
| *H02J 7/00* | (2006.01) | |
| *H02J 50/60* | (2016.01) | |

(52) U.S. Cl.
CPC ............ *H02J 50/12* (2016.02); *H02J 7/0029* (2013.01); *H02J 7/0042* (2013.01); *H02J 7/025* (2013.01); *H02J 50/60* (2016.02)

(58) Field of Classification Search
CPC ........ H02J 7/0029; H02J 7/0042; H02J 50/12; H02J 50/80; H02J 50/60
USPC .................. 320/107, 108, 114, 115; 307/104
See application file for complete search history.

(56) References Cited

U.S. PATENT DOCUMENTS

| | | | |
|---|---|---|---|
| 2012/0299389 A1* | 11/2012 | Lee ........................... | H02J 7/02 307/104 |
| 2015/0011160 A1* | 1/2015 | Jurgovan ................... | G06F 1/26 455/41.1 |

FOREIGN PATENT DOCUMENTS

| | | |
|---|---|---|
| JP | 2013038854 A | 2/2013 |
| JP | 2014107971 A | 6/2014 |

* cited by examiner

*Primary Examiner* — Edward Tso
(74) *Attorney, Agent, or Firm* — Cantor Colburn LLP

(57) ABSTRACT

A wireless power transmitting device includes a power feeder configured to transmit a power signal to a wireless power receiving device, and a detector configured to detect a wireless device in proximity of the power feeder for communication or power feeding separate from communication or power feeding for the wireless power transmitting device.

11 Claims, 6 Drawing Sheets

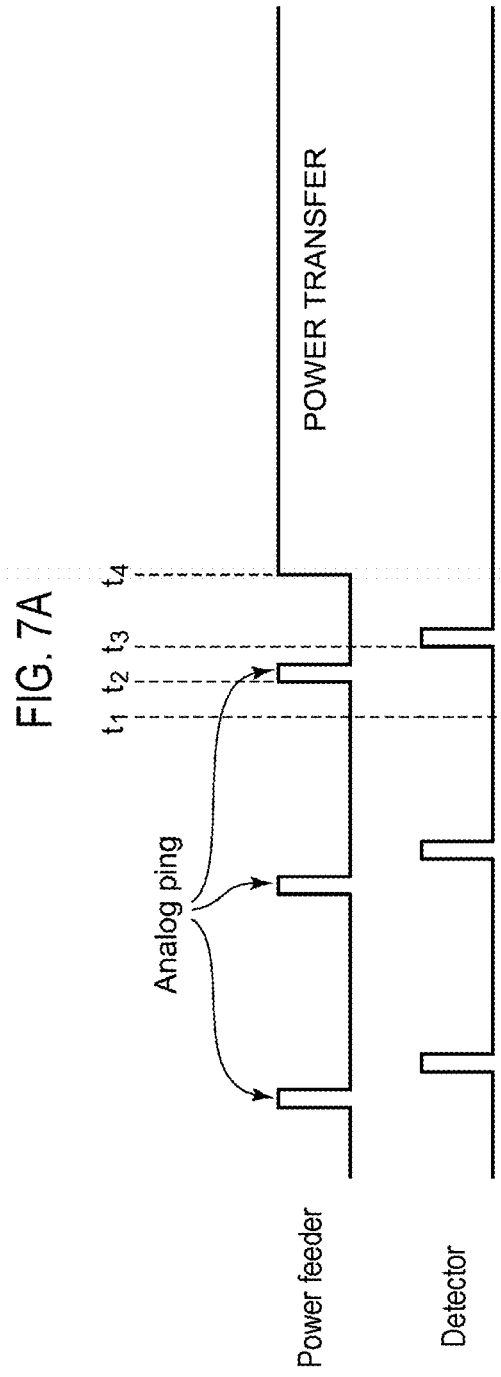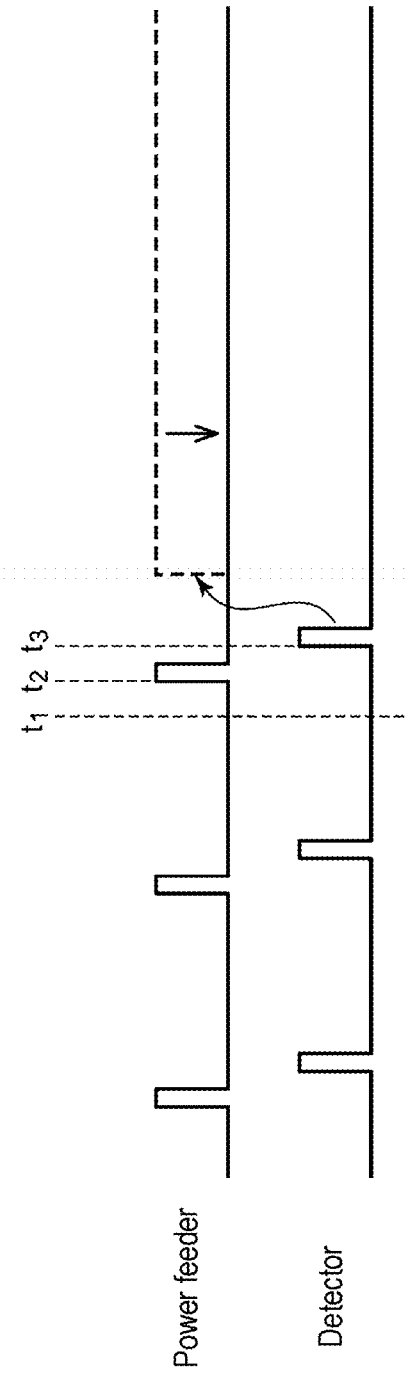

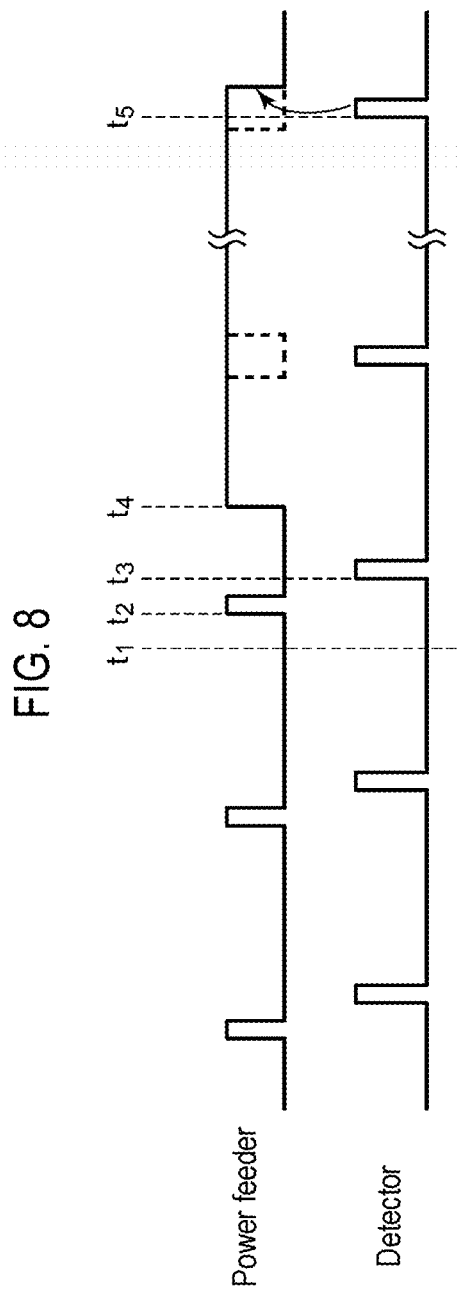

WIRELESS POWER TRANSMITTING DEVICE, CONTROL CIRCUIT THEREOF, AND WIRELESS CHARGER

CROSS-REFERENCE TO RELATED APPLICATION

The present application claims priority under 35 U.S.C. § 119 to Japanese Patent Application No. 2018-102531, filed on May 29, 2018, the entire contents of which are incorporated herein by reference.

TECHNICAL FIELD

The present disclosure relates to a wireless power feeding technology, and more particularly to control of transmission power.

BACKGROUND

In recent years, wireless power feeding has been spreading for supplying power to electronic apparatuses. The Wireless Power Consortium (WPC) was organized to facilitate the mutual use between products of different manufacturers, and the international standard Qi was formulated by the WPC.

Power feeding based on the Qi standard utilizes electromagnetic induction between a transmitting coil and a receiving coil. Power feeding systems include a power feeding device having a transmitting coil, and a power receiving terminal having a receiving coil.

FIG. 1 is a drawing that shows a configuration of a wireless power feeding system 10 conforming to the Qi standard. The power feeding system 10 includes a power transmitting device 20 (TX, Power Transmitter) and a power receiving device 30 (RX, Power Receiver). The power receiving device 30 is installed on an electronic apparatus such as a mobile phone terminal, a smartphone, an audio player, a game device, a tablet terminal or the like.

The power transmitting device 20 includes a transmitting coil (primary coil) 22, an inverter circuit 24, a controller 26 and a demodulator 28. The inverter circuit 24 includes an H bridge circuit (full bridge circuit) or a half bridge circuit, applies a drive signal S1, specifically a pulse signal, to the transmitting coil 22, and generates an electromagnetic power signal S2 in the transmitting coil 22 by a drive current flowing in the transmitting coil 22. The controller 26 controls an overall operation of the power transmitting device 20.

In the Qi standard, a communication protocol is defined between the power transmitting device 20 and the power receiving device 30, and information can be delivered by a control signal S3 from the power receiving device 30 to the power transmitting device 20. The control signal S3 is transmitted from a receiving coil 32 (secondary coil) to the transmitting coil 22 in a form of amplitude modulation (AM) using backscattering modulation. The control signal S3 includes, for example, power control data (also referred to as a packet) for controlling an amount of power supplied to the power receiving device 30, data indicating information unique to the power receiving device 30, and the like. The demodulator 28 demodulates the control signal S3 based on a current or voltage of the transmitting coil 22. The controller 26 controls the inverter circuit 24 based on the power control data included in the demodulated control signal S3.

The power receiving device 30 includes the receiving coil 32, a rectifying circuit 34, a smoothing capacitor 36, a modulator 38, a load 40, a controller 42 and a power supply circuit 44. The receiving coil 32 receives the power signal S2 from the transmitting coil 22 and transmits the control signal S3 to the transmitting coil 22. The rectifying circuit 34 and the smoothing capacitor 36 rectify and smooth a current S4 induced in the receiving coil 32 according to the power signal S2, and convert it into a DC voltage $V_{RECT}$.

The power supply circuit 44 charges a secondary battery (not shown) using the power supplied from the power transmitting device 20, or steps up or down the DC voltage $V_{RECT}$ and supplies it to the controller 42 and the load 40.

The controller 42 generates power control data (also referred to as control error packet or CE packet) for controlling the amount of power supplied from the power transmitting device 20 such that the rectified voltage $V_{RECT}$ approaches its target value. The modulator 38 modulates the control signal S3 including the power control data, and modulates a coil current of the receiving coil 32 to modulate a coil current and a coil voltage of the transmitting coil 22.

As a result of reviewing the wireless power feeding, the present inventor has come to recognize the following problems. FIG. 2 is a drawing that explains an application program of wireless power feeding. The power receiving device 30 is incorporated in an electronic apparatus 52 such as a smartphone, etc. and the power transmitting device 20 is incorporated in a charger 50.

When in use, the electronic apparatus 52 is placed on a top surface of the charger 50. When the power receiving device 30 is detected, the power transmitting device 20 transmits power to the power receiving device 30.

However, the electronic apparatus 52 may incorporate a wireless device 60 of a standard different from the standard supported by the power transmitting device 20 and the power receiving device 30, or the wireless device 60 may be attached together with its protective housing to the electronic apparatus 52. For example, the power transmitting device 20 and the power receiving device 30 may support the Qi standard, and the wireless device 60 may include a coil or a resonant device having a standard different from the Qi standard, such as a tag of NFC (Near Field Communication) or RFID (Radio Frequency Identifier).

Whereas the frequency used in wireless power feeding is about 100 kHz, the frequency used in NFC and RFID is in a band of several MHz to several tens of MHz, and they are substantially different. However, when a power signal transmitted by the power transmitting device 20 is incident on the coil of the wireless device 60, an overvoltage may be generated in a circuit element of the wireless device 60, which may reduce the reliability of the wireless device 60. Further, this problem should not be taken as a general recognition of those skilled in the art.

The wireless power feeding standard mandates a function of foreign object detection (FOD), but from a detection method thereof, a detectable object is limited to a metal piece or the like, and thus it is not easy to detect the wireless device 60 having a different standard.

SUMMARY

Some embodiments of the present disclosure provide a wireless power transmitting device capable of preventing reduction in reliability of a wireless device, which accompanies a power receiving device to which power is fed, and has a standard different from that of the power receiving device.

According to an embodiment of the present disclosure, there is provided a wireless power transmitting device including: a power feeder configured to transmit a power signal to a wireless power receiving device; and a detector configured to detect a wireless device in proximity of the power feeder for communication or power feeding separate from communication or power feeding for the wireless power transmitting device.

According to another embodiment of the present disclosure, there is provided a wireless charger including: a charging stand on which an electronic apparatus is placed; a transmitting antenna installed immediately below the charging stand and having a resonant frequency in a first frequency band used for wireless power feeding; a drive circuit configured to drive the transmitting antenna and generate a power signal in the transmitting antenna; and a detector configured to detect a wireless device in proximity of the transmitting antenna for communication or power feeding separate from communication or power feeding for the wireless charger.

According to another embodiment of the present disclosure, there is provided a control circuit of a wireless power transmitting device for transmitting a power signal to a wireless power receiving device. The control circuit is used together with a transmitting antenna having a resonant frequency in a first frequency band used for wireless power feeding, and a detecting antenna having a resonant frequency in a second frequency band different from the first frequency band. The control circuit includes: a first controller configured to control a first inverter configured to drive the transmitting antenna; a second controller configured to control a second inverter connected to the detecting antenna; and a determining part configured to determine presence or absence of a wireless device conforming to a standard separate from a standard supported by the wireless power transmitting device and the wireless power receiving device, based on a state of the detecting antenna.

Any combinations of the above-described elements or mutual substitutions of elements or expressions of the present disclosure between methods, apparatuses, systems, and the like are also effective as embodiments of the present disclosure.

BRIEF DESCRIPTION OF DRAWINGS

FIG. 7A and FIG. 7B are timing charts for explaining an operation of the power transmitting device.

FIG. 8 is a timing chart for explaining another operation of the power transmitting device.

DETAILED DESCRIPTION

Figure 1:
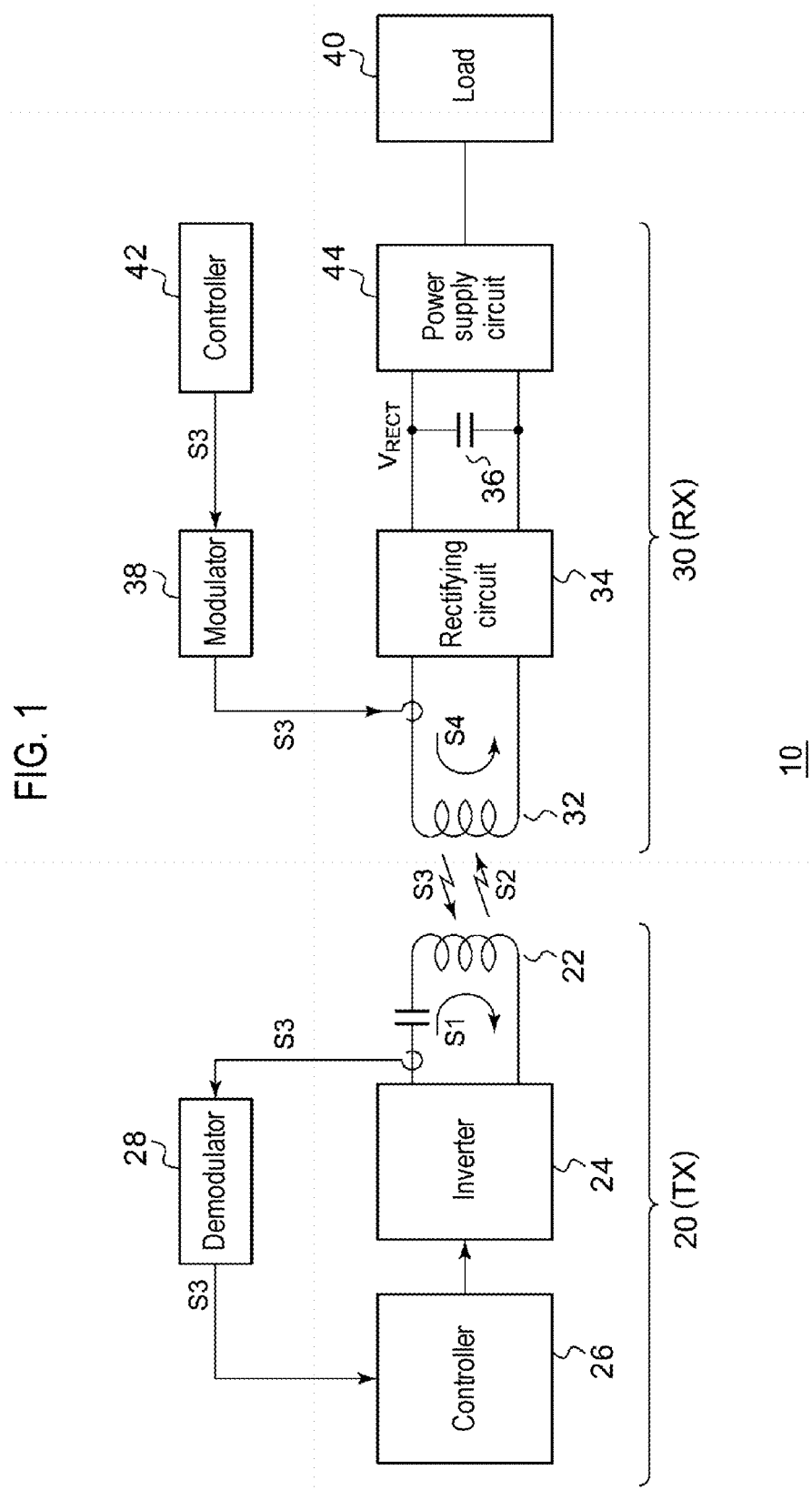
FIG. 1 is a drawing that shows a configuration of a wireless power feeding system conforming to the Qi standard.
Figure 2:
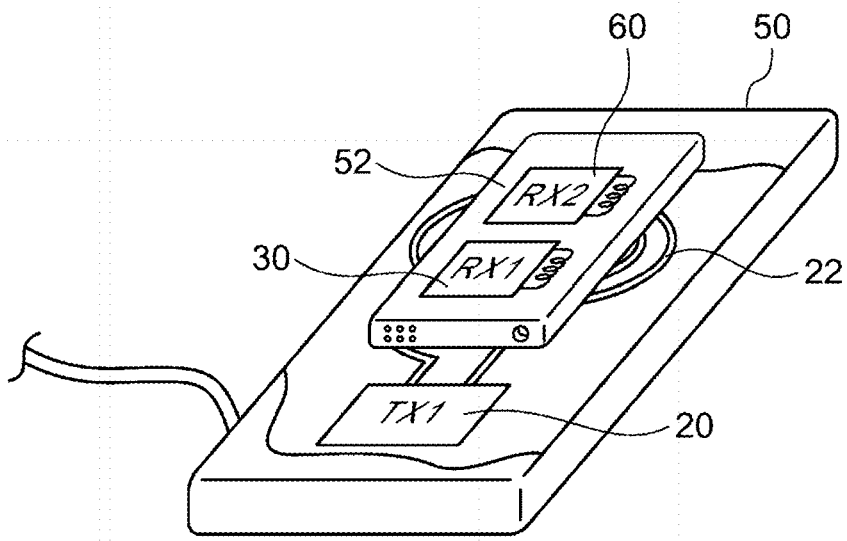
FIG. 2 is a drawing that explains an example in which wireless power feeding is applied.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are directly connected physically or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

Figure 3:
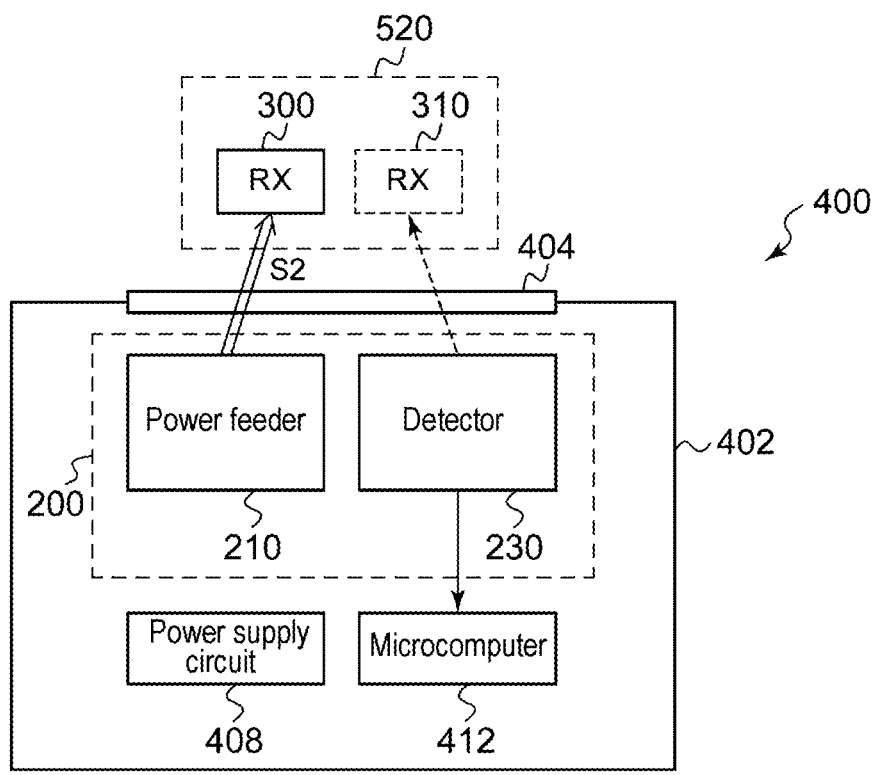
FIG. 3 is a block diagram of a power transmitting device according to an embodiment of the present disclosure.

FIG. 3 is a block diagram of a power transmitting device 200 according to an embodiment of the present disclosure. The power transmitting device 200 is incorporated in a charger 400. The charger 400 may include a housing 402, a charging stand 404, a power supply circuit 408 and a microcomputer 412 in addition to the power transmitting device 200. The power supply circuit 408 converts an AC voltage into a DC voltage and supplies the DC voltage to the power transmitting device 200. The charging stand 404 is installed on a top surface of the housing 402, and an electronic apparatus 520 to be supplied with power can be placed on the charging stand 404. The microcomputer 412 controls an overall operation of the charger 400. The microcomputer 412 may be incorporated in the power transmitting device 200.

The power transmitting device 200 includes a power feeder 210 and a detector 230. The power feeder 210 transmits a power signal S2 to a wireless power receiving device 300. For example, the power feeder 210 and the wireless power receiving device 300 may conform to or correspond to the Qi standard.

The detector 230 is configured to detect a wireless device 310 for another communication or another power feeding in proximity of the power feeder 210. The wireless device 310 to be detected by the detector 230 is a receiver having a standard different from the Qi standard, such as an NFC or RFID tag. As described above, the wireless device 310 is incorporated in or externally attached to the electronic apparatus 520 that incorporates the wireless power receiving device 300. The detector 230 is activated prior to start of power feeding by the power feeder 210. When the wireless device 310 is detected, the detector 230 notifies the microcomputer 412 of the detection.

Figure 4:
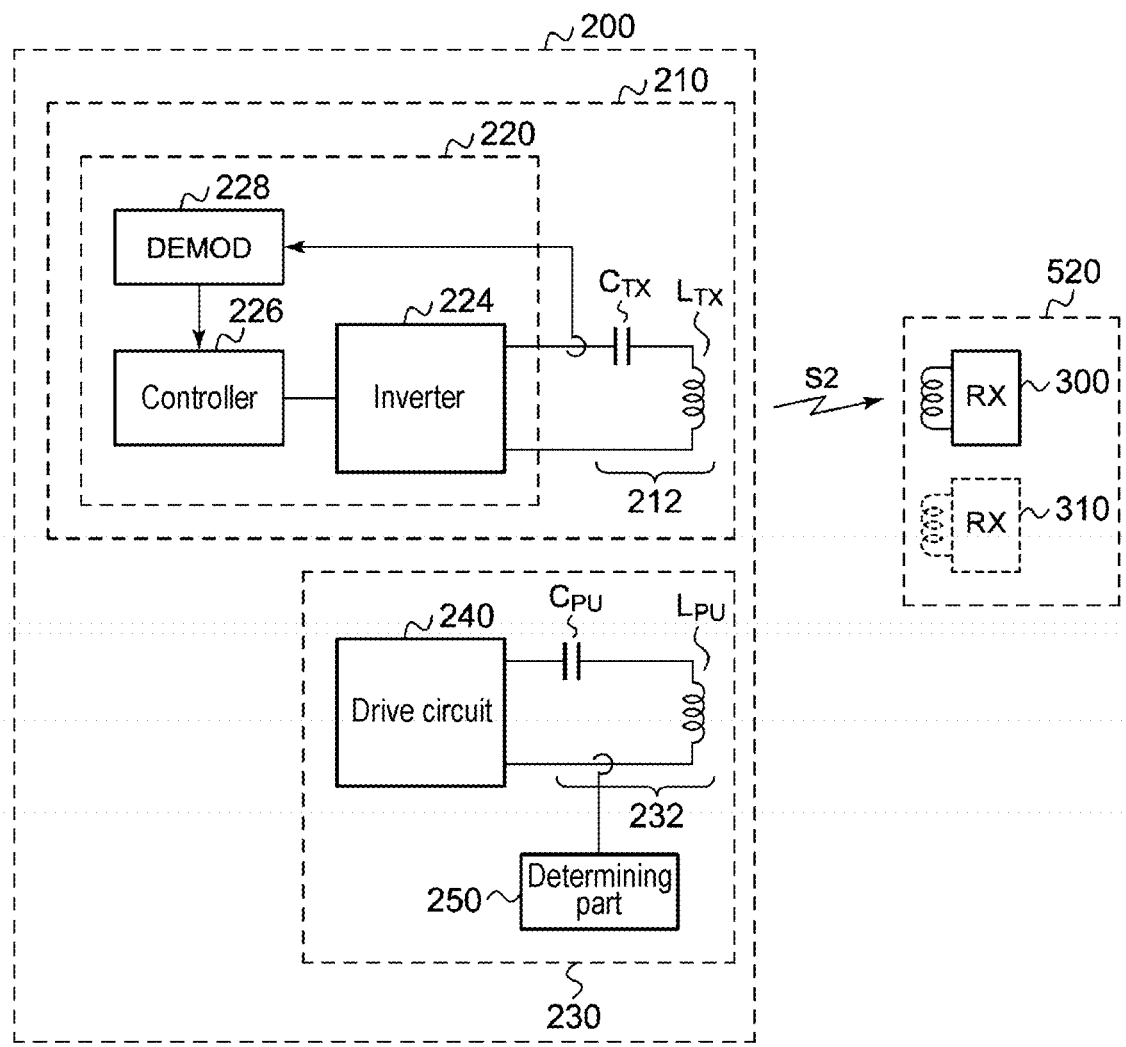
FIG. 4 is a circuit diagram showing a configuration of the power transmitting device.

FIG. 4 is a circuit diagram showing a configuration of the power transmitting device 200. The power feeder 210 includes a transmitting antenna 212 and a drive circuit 220. The transmitting antenna 212 has a resonant frequency in a frequency band used as the wireless power signal S2, and includes a transmitting coil $L_{TX}$ and a resonant capacitor $C_{TX}$ connected in series. The drive circuit 220 drives the transmitting antenna 212 to generate the wireless power signal S2 in the transmitting coil $L_{TX}$. The drive circuit 220 includes an inverter 224, a controller 226 and a demodulator 228.

These components are the same as those in FIG. 1 and therefore, explanation thereof will not be repeated.

A principle of the detector 230 detecting the wireless device 310 can be the same as a principle of the power feeder 210 detecting the wireless power receiving device 300. The detector 230 includes a detecting antenna 232, a driver 240 and a determining part 250. The detecting antenna 232 has a resonant frequency in a second frequency band different from a first frequency band used by the power feeder 210. The second frequency band is a frequency band used by the wireless device 310 to be detected by the detector 230.

The driver 240 drives the detecting antenna 232 with an AC signal. When the wireless device 310 approaches the detecting antenna 232, a receiving coil of the wireless device 310 couples to the detecting antenna 232, and as an effect thereof, a state of a resonant circuit including the detecting antenna 232 changes. The determining part 250 monitors the state (voltage or current) of the detecting antenna 232 and detects the change to determine whether or not the wireless device 310 is present.

Figure 5:
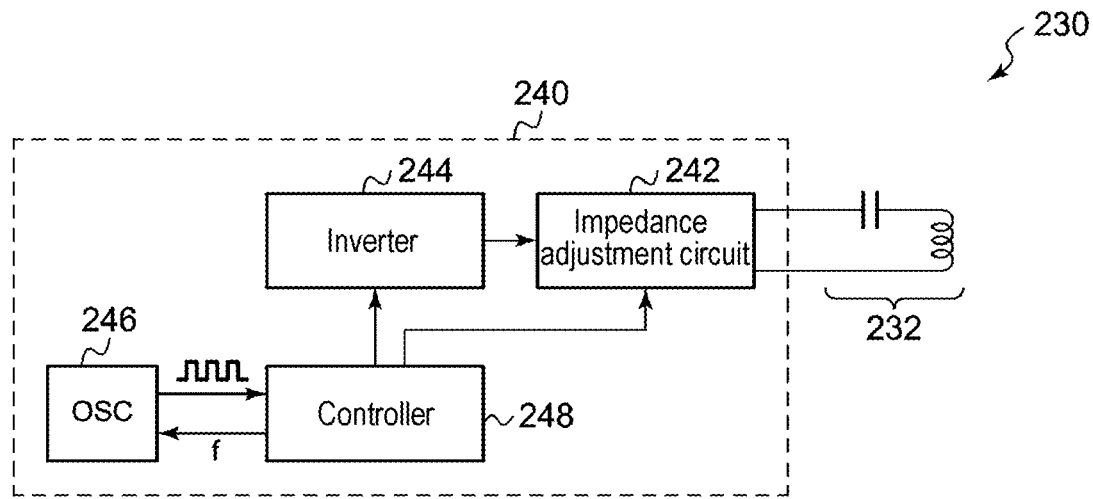
FIG. 5 is a block diagram showing a configuration example of a detector.

FIG. 5 is a block diagram showing a configuration example of the detector 230. The driver 240 includes an impedance adjustment circuit 242, an inverter 244, an oscillator 246 and a controller 248. The oscillator 246 oscillates in the second frequency band. In some embodiments, the second frequency band may include 6.78 MHz and 13.56 MHz, and may be a band of, for example, 2 MHz to 20 MHz.

An oscillation frequency f of the oscillator 246 is adjustable in some embodiments. The impedance adjustment circuit 242 is coupled to the detecting antenna 232 and can adjust an impedance of the resonant circuit, in other words, the resonant frequency. The controller 248 tunes the impedance adjustment circuit 242 to a frequency used by the wireless device 310 to be detected. The controller 248 controls the inverter 244 based on the output signal of the oscillator 246 to drive the detecting antenna 232. When the number of types of wireless devices 310 to be detected is one, a circuit constant of the impedance adjustment circuit 242 may be fixed.

Figure 6:
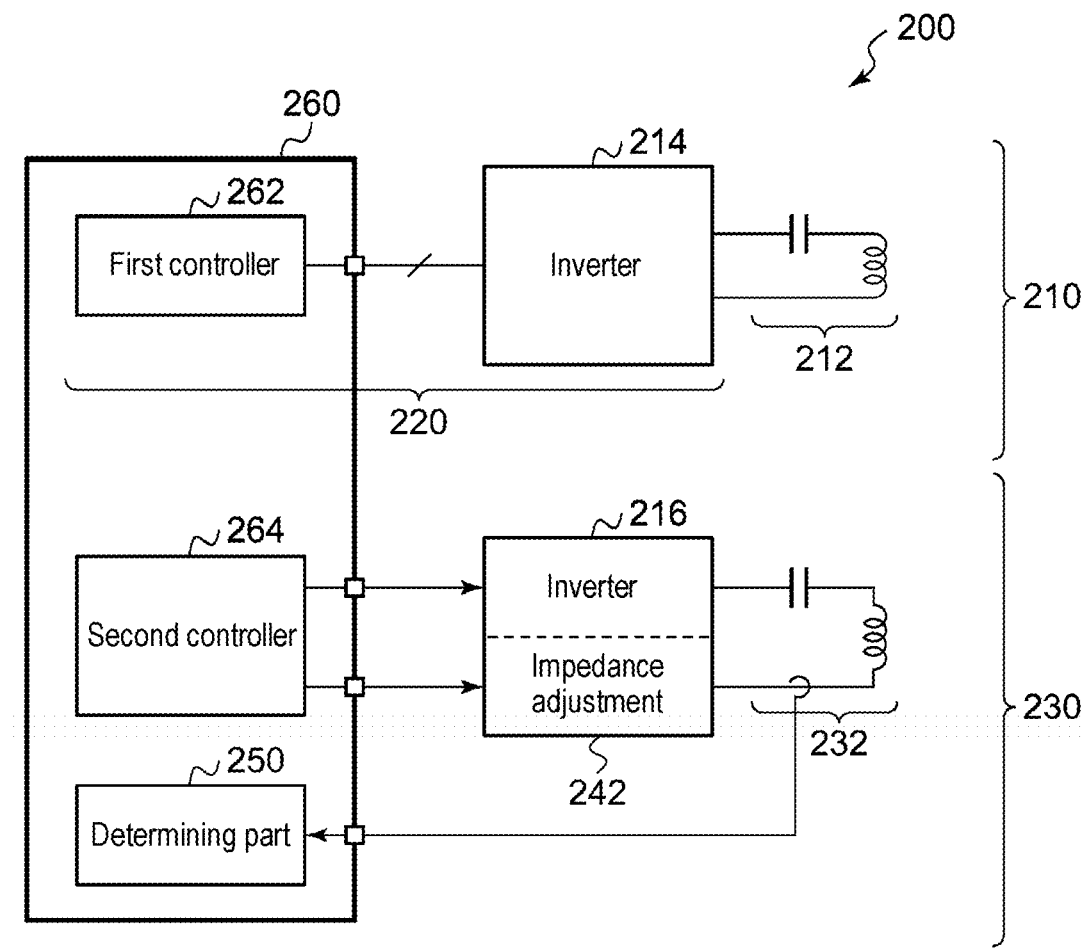
FIG. 6 is a block diagram showing a configuration example of the power transmitting device.

FIG. 6 is a block diagram showing a configuration example of the power transmitting device 200. A portion of the power feeder 210 and a portion of the detector 230 are integrated in a common semiconductor chip (a control circuit 260). A first inverter 214 corresponds to the inverter 224 in FIG. 4 and is connected to the transmitting antenna 212. A second inverter (driver) 216 corresponds to the inverter 244 of FIG. 5. The second inverter 216 and the impedance adjustment circuit 242 are connected to the detecting antenna 232. Some or all of the first inverter 214, the second inverter 216 and the impedance adjustment circuit 242 may be integrated in the control circuit 260.

The control circuit 260 includes a first controller 262, a second controller 264, a determining part 250 and a demodulator 228. The first controller 262 corresponds to the controller 226 and the demodulator 228 in FIG. 4 and drives the first inverter 214 to control power feeding to the wireless power receiving device 300.

The second controller 264 controls the second inverter 216 and the impedance adjustment circuit 242 in association with the detection of the wireless device 310. The second controller 264 includes the oscillator 246 and the controller 248 of FIG. 5.

The determining part 250 determines presence or absence of the wireless device 310 based on an electrical state of the detecting antenna 232.

The above is the configuration of the power transmitting device 200. Subsequently, an operation thereof will be described. FIG. 7A and FIG. 7B are timing charts for explaining the operation of the power transmitting device 200.

The operation when the electronic apparatus 520 does not include the wireless device 310 will be described with reference to FIG. 7A. Initially, the electronic apparatus 520 to be fed with power does not exist on the charging stand 404.

The power feeder 210 performs an analog-ping and attempts to detect the electronic apparatus 520 that incorporates the wireless power receiving device 300. Immediately after the analog-ping of the power feeder 210, the detector 230 becomes active and performs a process of detecting the wireless device 310. This operation is periodically repeated until the electronic apparatus 520 is detected.

At time $t_1$, the electronic apparatus 520 to be fed with power is placed on the charging stand 404. The electronic apparatus 520 includes the wireless power receiving device 300 but does not include the wireless device 310. At time $t_2$ after time $t_1$, the wireless power receiving device 300 is detected by the analog-ping. In the operation of the detector 230 at subsequent time $t_3$, the wireless device 310 is not detected. Therefore, at time $t_4$, the power feeder 210 shifts to a power transfer phase and starts feeding power to the wireless power receiving device 300.

The operation when the electronic apparatus 520 includes the wireless device 310 will be described with reference to FIG. 7B. Initially, the electronic apparatus 520 to be fed with power does not exist on the charging stand 404.

The operation up to time $t_2$ is the same as that shown in FIG. 7A. When the detector 230 becomes active at time $t_3$, the wireless device 310 is detected. Then, the power feeder 210 does not shift to the power transfer phase, and therefore, power feeding to the wireless power receiving device 300 is not performed.

FIG. 8 is a timing chart for explaining another operation of the power transmitting device 200. In this operation, the detector 230 is intermittently activated during the power transfer phase after start of the power feeding by the power feeder 210 (after time $t_4$), and attempts to detect the wireless device 310. The operation cycle of the detector 230 during the power transfer phase may be different from the operation cycle before and/or after the power transfer phase. When the detector 230 detects the wireless device 310 at time $t_5$, the power transfer phase ends.

The above is the operation of the power transmitting device 200. According to the power transmitting device 200, the presence or absence of the wireless device 310 approaching the power feeder 210 is determined. When the wireless device 310 approaches the power feeder 210, power feeding from the power feeder 210 to the wireless power receiving device 300 is restricted. As a result, the power signal S2 generated by the power feeder 210 can be prevented from being input to a coil of the wireless device 310 and generating an electromotive force inside the wireless device 310. In particular, in a case where the wireless device 310 is an NFC tag or an RFID tag, since a withstand voltage of a circuit element constituting the wireless device 310 is low, reduction in reliability can be prevented by suppressing an incidence of the power signal S2.

After the power feeding by the power feeder 210 starts, the power feeder 210 may temporarily stop the power feeding, as indicated by a broken line, during a period in which the detector 230 is active. As a result, it is possible to suppress interference between the power feeder 210 and the detector 230 and enhance accuracy of detection of the wireless device 310 by the detector 230.

The present disclosure has been described above by way of embodiments. The disclosed embodiments are illustrative only. It should be understood by those skilled in the art that various modifications to combinations of elements or processes may be made and such modifications fall within the scope of the present disclosure. Such modifications will be described below.

Although the embodiments describe the Qi standard, the present disclosure is applicable to derivative standards of the Qi standard that will be formulated in the future, or different standards.

While the present disclosure has been described by way of specific embodiments, it is to be understood that the disclosed embodiments are merely illustrative of the principles and applications of the present disclosure. Many modifications and changes in arrangements may be made without departing from the spirit defined in the claims of the present disclosure.

According to the present disclosure in some embodiments, it is possible to prevent reduction in reliability of a wireless device, which accompanies a power receiving device to which power is fed, and has a standard different from that of the power receiving device.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A wireless power transmitting device comprising:
   a power feeder configured to transmit a power signal to a wireless power receiving device; and
   a detector configured to detect a wireless device in proximity of the power feeder for communication or power feeding separate from communication or power feeding by the wireless power transmitting device,
   wherein, when the wireless device is detected by the detector, the power feeding by the power feeder is restricted.

2. The wireless power transmitting device of claim 1, wherein the detector includes:
   a detecting antenna having a resonant frequency in a second frequency band different from a first frequency band used by the power feeder;
   a driver configured to drive the detecting antenna; and
   a determining part configured to determine presence or absence of the wireless device based on a state of the detecting antenna.

3. The wireless power transmitting device of claim 1, wherein the detector operates prior to start of power feeding by the power feeder.

4. The wireless power transmitting device of claim 1, wherein the detector operates intermittently after start of power feeding by the power feeder.

5. The wireless power transmitting device of claim 4, wherein the power feeder temporarily stops the power feeding during a period in which the detector operates after the start of power feeding by the power feeder.

6. The wireless power transmitting device of claim 2, wherein the second frequency band is a MHz band.

7. The wireless power transmitting device of claim 1, wherein the detector is configured to provide an external notification of a result of the detection.

8. The wireless power transmitting device of claim 2, wherein the driver includes:
   an impedance adjustment circuit coupled with the detecting antenna;
   an oscillator; and
   an inverter configured to drive the detecting antenna in response to an output of the oscillator.

9. A wireless charger comprising:
   a charging stand on which an electronic apparatus is placed;
   a transmitting antenna installed immediately below the charging stand and having a resonant frequency in a first frequency band used for wireless power feeding;
   a drive circuit configured to drive the transmitting antenna and generate a power signal in the transmitting antenna; and
   a detector configured to detect a wireless device in proximity of the transmitting antenna for communication or power feeding separate from communication or power feeding by the wireless charger,
   wherein, when the wireless device is detected by the detector, the power feeding by the wireless charger is restricted.

10. A control circuit of a wireless power transmitting device for transmitting a power signal to a wireless power receiving device, wherein the control circuit is used together with a transmitting antenna having a resonant frequency in a first frequency band used for wireless power feeding, and a detecting antenna having a resonant frequency in a second frequency band different from the first frequency band, the control circuit comprising:
   a first controller configured to control a first inverter connected to the transmitting antenna;
   a second controller configured to control a second inverter connected to the detecting antenna; and
   a determining part configured to determine presence or absence of a wireless device using the second frequency band based on a state of the detecting antenna,
   wherein, when the determining part determines that the wireless device is present, the transmission of the power signal by the wireless power transmitting device is restricted.

11. A wireless power transmitting device comprising:
   a power feeder configured to transmit a power signal to a wireless power receiving device; and
   a detector configured to detect a wireless device in proximity of the power feeder for communication or power feeding separate from communication or power feeding for the wireless power transmitting device,
   wherein the detector includes:
      a detecting antenna having a resonant frequency in a second frequency band different from a first frequency band used by the power feeder;
      a driver configured to drive the detecting antenna; and
      a determining part configured to determine presence or absence of the wireless device based on a state of the detecting antenna, and wherein the driver includes;
      an impedance adjustment circuit coupled with the detecting antenna;
      an oscillator; and
      an inverter configured to drive the detecting antenna in response to an output of the oscillator.

* * * * *